Figure 1:
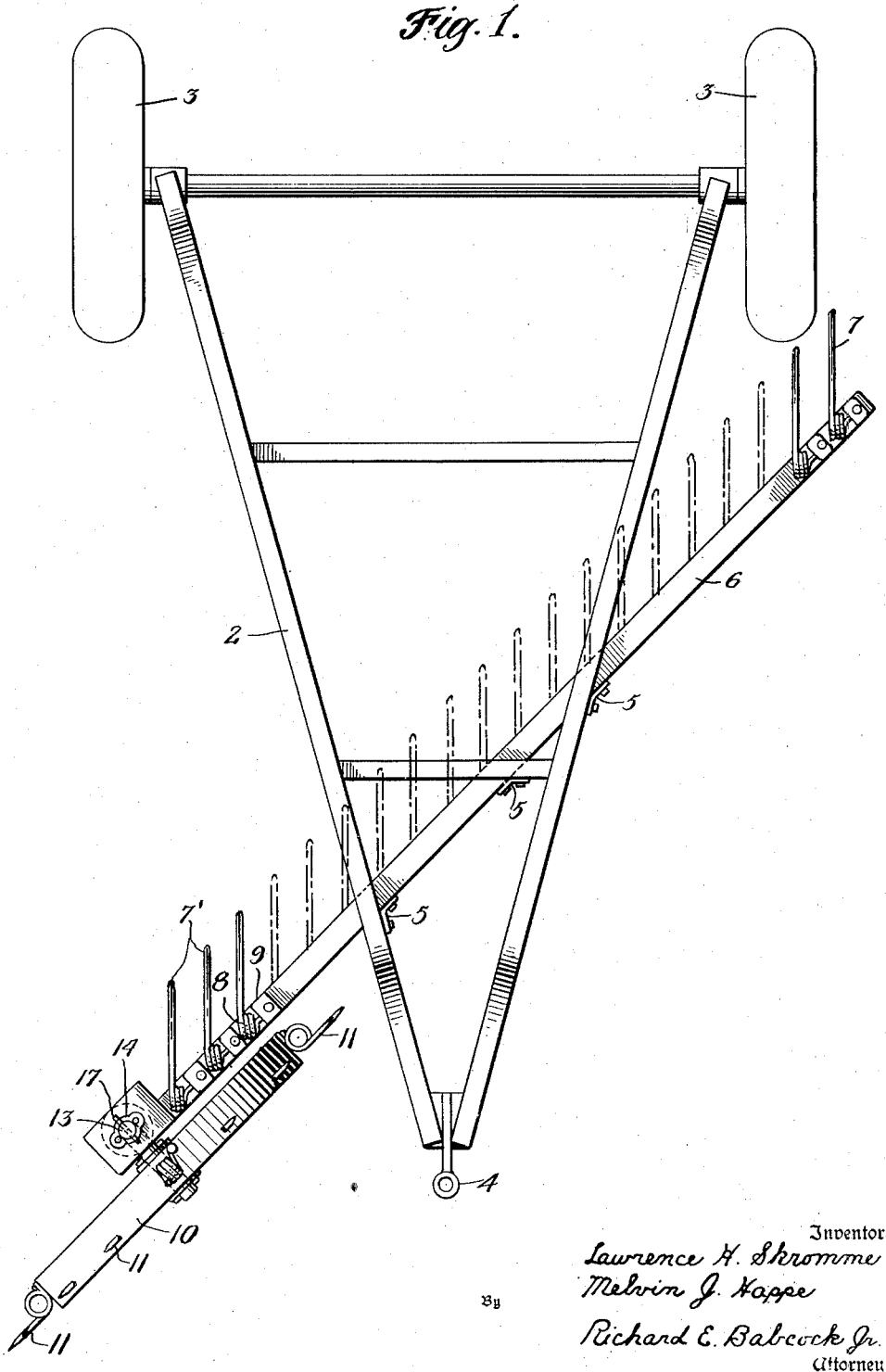

April 8, 1958 L. H. SKROMME ET AL 2,829,486
SIDE DELIVERY RAKE HAVING STATIONARY
AND ROTATABLE RAKING ELEMENTS
Filed April 14, 1955 3 Sheets-Sheet 1

Inventors
Lawrence H. Skromme
Melvin J. Happe
By
Richard E. Babcock Jr.
Attorney Inventors
Lawrence H. Skromme
Melvin J. Happe
Richard E. Babcock Jr.
By
Attorney April 8, 1958  L. H. SKROMME ET AL  2,829,486
SIDE DELIVERY RAKE HAVING STATIONARY
AND ROTATABLE RAKING ELEMENTS
Filed April 14, 1955  3 Sheets-Sheet 3
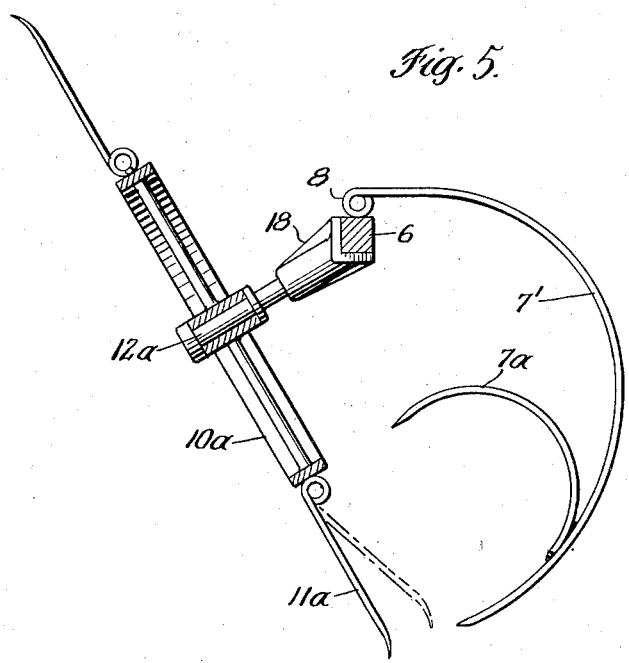
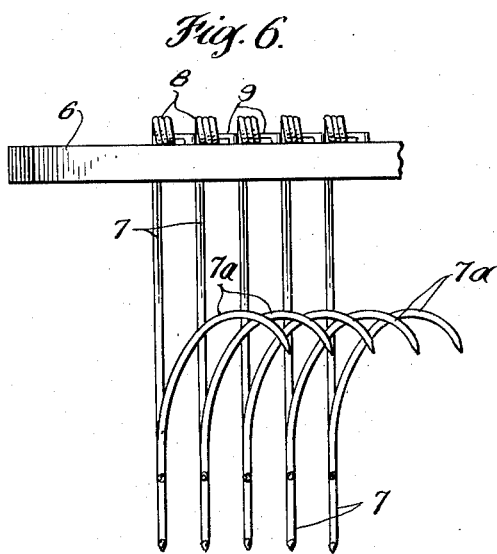
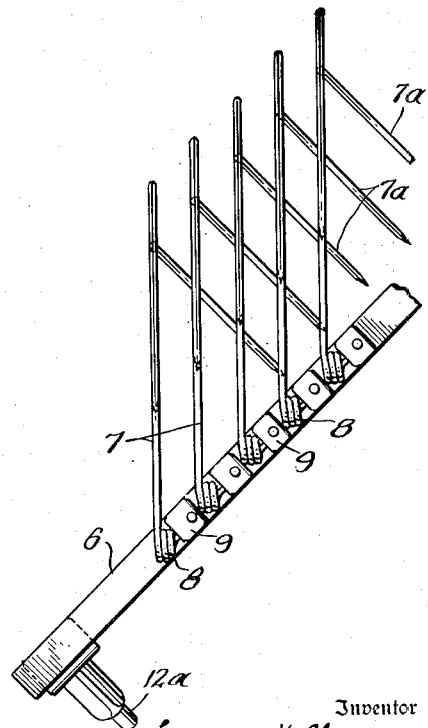
Inventor
Lawrence H. Skromme
Melvin J. Happe
Richard E. Babcock Jr.
By
Attorney United States Patent Office 2,829,486
Patented Apr. 8, 1958

2,829,486

SIDE DELIVERY RAKE HAVING STATIONARY AND ROTATABLE RAKING ELEMENTS

Lawrence H. Skromme, Manheim Township, Lancaster County, and Melvin J. Happe, New Holland, Pa., assignors, by mesne assignments, to Sperry Rand Corporation, New Holland, Pa., a corporation of Delaware Application April 14, 1955, Serial No. 501,284

3 Claims. (Cl. 56—376)

This invention relates to a side delivery hay rake of the type in which a series of curved stationary tines supported from the rake frame extend diagonally to the path of movement of the frame and thus function to elevate the hay slightly and roll it into a windrow at the rearmost end of the series of tines.

This application is a continuation-in-part of our copending application Serial No. 287,944, filed May 15, 1952 and now abandoned.

It has heretofore been known in such rakes to provide an auxiliary rake element carried by the rake frame in advance of the leading rake tine or tines to clear away hay which might otherwise become hung up on the leading rake tine and thus interfere with the raking action. For prior examples of such auxiliary raking elements, reference is made to the United States patents to Bailey, No. 382,067 of May 1, 1888, and to Henning, No. 743,720 of November 10, 1903. In such prior known rakes, the auxiliary raking element has functioned to move a part of the hay out of the path of the main series of rake tines and thus has somewhat diminished the capacity of the rake.

Moreover, although such rakes have proven advantageous due to the comparatively small number of moving parts, and the fact that they may be economically produced, the performance of rakes of this type has been hindered due at least in part to the fact that where such a rake is pulled along a swath of previously mowed hay, the stems of the hay will lie predominantly in the direction of movement of the rake, and many of these stems will tend to pass between or longitudinally of the rake tines, and thus, constitute an obstacle to the transverse movement of hay across the rake toward its discharge end.

It is the primary object of our invention to remedy this difficulty by providing such a rake in which the tendency of the hay to pass between and hang up on the rake tines is greatly reduced, thus, increasing the over-all efficiency of the rake. We have found that the difficulty above mentioned may be readily overcome by mounting a usual ground-driven rake wheel in advance of the leading rake tine or tines for rotation in a plane generally parallel to the diagonal series of rake tines to clear the hay from the path of the leading tine or tines, while at the same time, redistributing such hay so that its stems lie transversely to the movement of the rake proper, and in the path thereof, thereby tending to form a continuous series or rope of such transversely lying hay stems which will normally extend across adjoining rake tines to facilitate the initiation of the rolling action at the leading end of the rake and to be incorporated continuously into the hay which is contacted by the rake to form a core around which the hay is rolled, as it moves transversely across the rake.

Otherwise stated, it is an important object of the invention to provide such a raking wheel associated with the rake frame proper in such manner as to maintain the leading rake tine or tines clear and, in addition, to redistribute the longitudinally disposed hay stems to extend transversely of the movement of the rake, and thus form a generally transversely extending core about which other hay is rolled as the rake is progressed across the field.

In one embodiment of the invention, the rake wheel is rotatably supported for vertical floating movement so that it may ride over obstacles and irregularities in the terrain.

In a further embodiment, the rake wheel is supported for rotation about a fixed axis on the rake frame, the wheel rotating in an inclined plane and having rearwardly and upwardly resiliently deflectable tines or fingers adapted to ride over irregularities and obstacles. It is a further object in this embodiment to so arrange the rake wheel that its fingers may rotate in close proximity to the leading rake tooth to clear hay therefrom, the fingers being mounted for deflection in a path which will avoid collision with the rake teeth.

Figure 2:
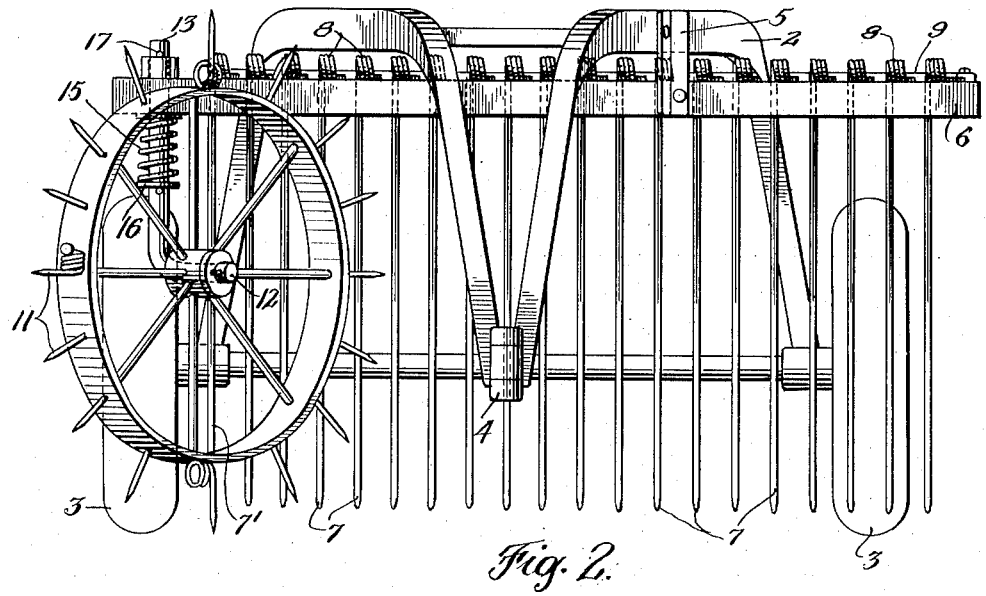
Figure 3:
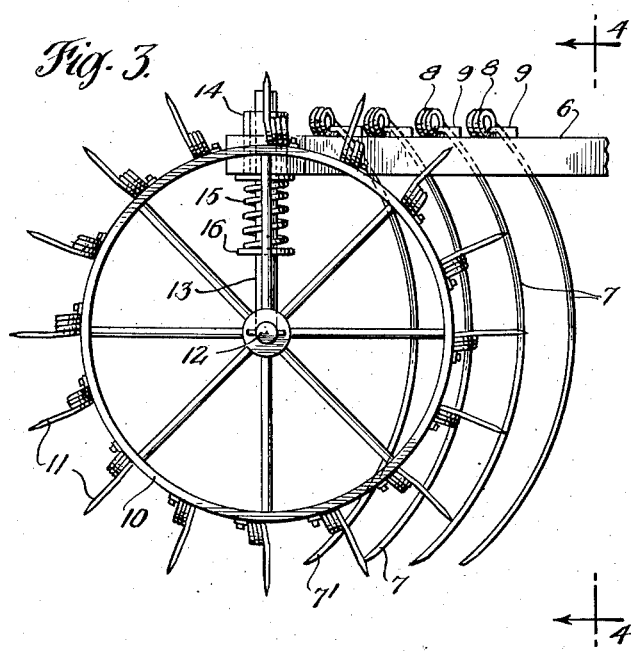
Figure 4:
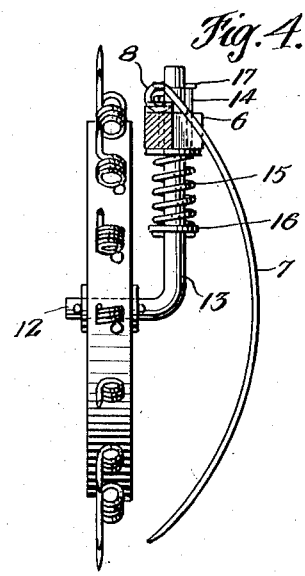

The foregoing and other incidental objects and advantages are attained by the embodiments of the invention illustrated in the accompanying drawings, in which:

Figure 1 represents a plan view of a hay rake embodying the preferred form of the invention;

Figure 2, a front elevation of the rake of Figure 1;

Figure 3, a side elevation of the rake wheel and the adjacent portion of the rake bar;

Figure 4, a section on the line 4—4 of Figure 3;

Figure 5, a section through the rake bar of the modified form of rake taken in the plane of the leading rake tine;

Figure 6, a front elevation of the end portion of the rake bar of the modification illustrated in Figure 5, omitting the rake wheel; and, Figure 7, a plan view of the mechanism shown in Figure 5.

Referring now in detail to the accompanying drawings and first referring to Figure 1, the rake of the invention may embody a usual supporting frame 2, the rear end of which is supported on wheels 3, and the front end of which is provided with a coupling 4, by means of which it is supported and drawn forwardly by a usual farm tractor.

Supported from the frame by brackets 5 (Figure 1) is a rigid rake bar 6 which is disposed diagonally to the path of operative movement of the frame 2. A series of uniformly spaced curved rake tines 7 are mounted on the bar in diagonal alignment parallel to the bar 6. The upper ends of these tines 7 are connected to the bar 6, preferably in a manner which will permit independent rearward and upward deflection of the respective tines such as will enable them to individually ride over obstacles and irregularities in their paths of travel. In the instant embodiment, the upper ends of the tines 7 are formed as resilient spring coils 8, secured on the bar 7 by clamps 9 in usual manner.

The combination and arrangement of parts as thus far described is substantially similar in all respects to the disclosure of the United States patent to Arnold, No. 328,833 of October 20, 1885, and thus is not claimed as our invention.

In the operation of this type of rake, as the rake is drawn forwardly, the hay is engaged by the rake tines 7; and, due to the forwardly concave curvature of the tines and their diagonal disposition, the hay is slightly elevated and rolled while being delivered to the trailing end of the rake bar from which it extends rearwardly in a continuous windrow.

In actual use, however, since the mowed hay normally lies with its stems extending in a direction generally parallel to the movement of the rake, it has been found that hay will frequently tend to pass between the rake tines and obstruct the transverse movement of the hay toward the delivery end of the rake. In order to alleviate this difficulty, and to render the rake fully successful in operation, we have provided in conjunction with such a rake, a usual ground-driven finger wheel or rake wheel operatively disposed in advance of the leading rake tine 7' to clear the hay from the path of said tine and to redistribute the hay to lie with its stems generally transversely of the movement of the rake, and in the path thereof.

The embodiment of the invention illustrated in Figures 1 to 4 utilizes a finger wheel 10 which is rotatably supported on the rake bar 6 for vertical floating movement in advance of the leading tine 7'. The rake wheel per se may be substantially as disclosed in the Pollard U. S. Patent 2,459,961 granted January 25, 1949. Such a wheel comprises a plurality of resilient tines or fingers 11 fixed to its rim and projecting radially therefrom.

As is customary, the wheel 10 is supported for rotation in a plane at an angle to the direction of travel of the frame 2, and substantially parallel to the rake bar 6 and the series of tines 7, to thus be rotated by ground engagement in a direction to urge hay from in front of the leading tine 7' toward the trailing end of the rake bar 6, while, at the same time, redistributing the hay to lie with the hay stems generally transversely of the rake movement.

The floating mounting for the wheel 10 may be of any usual type, though the type illustrated in Figures 1 to 4 is generally similar to that disclosed in the United States Patent No. 1,817,851 to Shelton, granted August 4, 1931. The wheel 10 is rotatably journaled on a horizontal stub-shaft 12, carried at the lower end of a rigid arm 13 which is slideably non-rotatably keyed through a sleeve 14 mounted on the rake bar 6. A spring 15 coiled about the arm 13, and under compression between the sleeve 14 and a stop 16 on the arm 13 resiliently opposes upward movement through the sleeve, and a pin 17 at the upper end of the arm limits its downward movement.

Thus, in operation, as the rake is drawn forwardly, it will be seen that the rake wheel 10 is rotated by ground engagement to clear hay from in front of the leading rake tines 7' and move it into the path of adjacent tines 7 from whence it is lifted and rolled by the tines to the trailing end of the rake. The rake wheel or finger wheel not only deflects the hay from in front of this leading rake tine 7', but, in doing so, it will be seen that it tends to redistribute the predominantly longitudinal stems of the hay and causes such stems as may be contacted by the rake wheel to extend in a direction generally parallel to the series of rake tines 7, and thus, transversely of the movement of the rake. Since the rake wheel is rotating continuously, it tends to form a continuous series or rope of such transversely lying hay stems which will normally extend across adjoining rake tines to facilitate the initiation of the rolling action at the leading end of the rake and to be incorporated continuously into the hay, which is contacted by the rake to form a core around which the hay is rolled at other points along the rake. Thus, in addition to its rake tine clearing function, the wheel 10 functions to redistribute the hay stems to lie transversely of the rake movement, and to form a generally transversely extending core about which other hay is rolled as the rake is progressed across the field.

In the modified form of the invention illustrated in Figures 5, 6, and 7, the construction and operation is similar to that above described except that hay guides 7a are associated with the respective rake tines 7 to expedite the transverse movement of the hay, and also the arrangement of the rake wheel 10a has been modified.

The operational principle and arrangement of the hay guides 7a is similar to that of the corresponding elements shown and described in the Witmer U. S. Patent No. 49,673 of August 29, 1865, the guides 7a comprising metal members, the lower ends of which are respectively welded to the rake tines 7. The upper portions and free ends of the guides 7a are forwardly concavely curved in parallel planes inclined toward the trailing side of the rake bar 6 to speed the passage of the hay toward that side.

The rake wheel 10a in this modification is supported for rotation on a stub-shaft 12a supported by a bracket 18 fixed on the rake bar 6, the shaft 12a being inclined to the horizontal so that the resilient tines 11a may yield rearwardly and upwardly to ride over obstacles or uneven terrain and thereby eliminate the necessity for a floating mounting.

Moreover, with this arrangement, the ground engaging portion of the wheel 10a is projected rearwardly, as in Figure 5, so that its tines 11a rotate in close proximity so the free end of the leading rake tine 7' to remove hay tending to pile up on said tine and drag therefrom. It is obviously desirable to avoid collision between the rake wheel tines 11a and the tines 7 or 7' of the rake and, due to the inclined rotational plane of the finger wheel 10a, it will be seen that deflection of the rake fingers 11a rearwardly toward the rake tines 7', 7 will, at the same time, raise the fingers 11a above and clear of the forwardly projected ends of the tines 7, 7'.

In this application we have shown and described only the preferred embodiment of our invention and one modification thereof, simply by way of illustration of the practice of the invention, as by law required. However, we recognize that the invention is capable of other and different embodiments and that its several details may be modified in various ways, all without departing from the invention. Accordingly, the drawings and description herein are to be considered as merely illustrative in nature, and not as exclusive.

Having thus described the invention, we claim:

1. A side delivery rake comprising an elongate support having a leading end and a trailing end, means on said support for moving it in an oblique direction, a plurality of rake teeth arranged along said support, and a raking wheel operatively associated with said support in front of said leading end for raking hay inwardly and from the path of said leading end, the hay raked by said wheel being delivered to rake teeth rearwardly of the leading end.

2. A side delivery rake as recited in claim 1 wherein said rake wheel is rotatable in a plane substantially parallel to the extension of said elongate support.

3. A side delivery rake as recited in claim 2 wherein said rake teeth have arcuate portions which extend in planes generally parallel to said oblique direction in which said support is adapted to move, and said rake wheel having rearwardly deflectable rake fingers, the disposition of said rake wheel being such relative to said support that the rake fingers on the wheel are maintained clear of engagement with the rake teeth on said support when said fingers are deflected.

References Cited in the file of this patent
UNITED STATES PATENTS

| | | |
|---|---|---|
| 328,833 | Arnold | Oct. 20, 1885 |
| 382,067 | Bally | May 1, 1888 |
| 743,720 | Henning | Nov. 10, 1903 |
| 2,459,961 | Pollard | Jan. 25, 1949 |
| 2,667,730 | McCall et al. | Feb. 2, 1954 |
| 2,712,723 | Ryan | July 12, 1955 |